United States Patent
Mori et al.

(10) Patent No.: US 10,427,473 B2
(45) Date of Patent: Oct. 1, 2019

(54) PNEUMATIC TIRE

(71) Applicant: Sumitomo Rubber Industries, Ltd., Kobe-shi, Hyogo (JP)

(72) Inventors: Kazuma Mori, Kobe (JP); Mitsuru Sueyoshi, Kobe (JP)

(73) Assignee: SUMITOMO RUBBER INDUSTRIES, LTD., Kobe-Shi, Hyogo (JP)

(*) Notice: Subject to any disclaimer, the term of this patent is extended or adjusted under 35 U.S.C. 154(b) by 311 days.

(21) Appl. No.: 15/409,668

(22) Filed: Jan. 19, 2017

(65) Prior Publication Data
US 2017/0210182 A1 Jul. 27, 2017

(30) Foreign Application Priority Data
Jan. 21, 2016 (JP) .................................. 2016-009929

(51) Int. Cl.
*B60C 13/02* (2006.01)
*B60C 11/01* (2006.01)
*B60C 13/00* (2006.01)

(52) U.S. Cl.
CPC .............. *B60C 13/02* (2013.01); *B60C 11/01* (2013.01); *B60C 13/002* (2013.01)

(58) Field of Classification Search
CPC ...................... B60C 11/01; B60C 11/11; B60C 13/00–13/002; B60C 13/02–13/023; B60C 2013/026
See application file for complete search history.

(56) References Cited

U.S. PATENT DOCUMENTS

| | | | | |
|---|---|---|---|---|
| 4,219,066 A | * | 8/1980 | Tamura | B60C 13/02 152/523 |
| 6,938,657 B1 | * | 9/2005 | Cucco | B60C 3/04 152/197 |
| 8,534,336 B2 | * | 9/2013 | Ohara | B60C 13/02 152/523 |
| 8,869,853 B2 | * | 10/2014 | Kurosawa | B60C 13/02 152/523 |
| 9,150,053 B2 | * | 10/2015 | Nomura | B60C 13/02 |
| 9,393,843 B2 | * | 7/2016 | Matsuda | B60C 13/02 |
| 2004/0007303 A1 | * | 1/2004 | Fishman | B60C 3/06 152/454 |
| 2010/0038001 A1 | * | 2/2010 | Yamaguchi | B60C 11/0309 152/153 |

(Continued)

FOREIGN PATENT DOCUMENTS

JP 2012-006449 A 1/2012

*Primary Examiner* — Jodi C Franklin
(74) *Attorney, Agent, or Firm* — Birch, Stewart, Kolasch & Birch, LLP

(57) ABSTRACT

A pneumatic tire includes sidewall portions, at least one of which is provided in the outer surface thereof with an axially outwardly protruding protector. The protector is composed of patterned unit protrusions arranged at intervals in the tire circumferential direction. Each patterned unit protrusion includes a first protruding portion and a second protruding portion which extend in a tire radial direction and spaced apart from each other in the tire circumferential direction, and a third protruding portion connecting between the first and second protruding portions. The radial dimension L1 of the first protruding portion is more than the radial dimension L2 of the second protruding portion.

20 Claims, 3 Drawing Sheets

(56) References Cited

U.S. PATENT DOCUMENTS

| | | | |
|---|---|---|---|
| 2010/0051159 A1* | 3/2010 | Fujioka | B60C 13/001 |
| | | | 152/523 |
| 2010/0288409 A1* | 11/2010 | Ohara | B60C 11/01 |
| | | | 152/209.11 |
| 2011/0088826 A1* | 4/2011 | Watanabe | B60C 13/02 |
| | | | 152/523 |
| 2012/0073719 A1* | 3/2012 | Kurosawa | B60C 13/02 |
| | | | 152/523 |
| 2012/0216930 A1* | 8/2012 | Matsuda | B60C 11/11 |
| | | | 152/209.18 |
| 2013/0068362 A1* | 3/2013 | Kudo | B60C 13/001 |
| | | | 152/450 |
| 2018/0065422 A1* | 3/2018 | Kuwano | B60C 13/02 |
| 2018/0126796 A1* | 5/2018 | Fujioka | B60C 3/04 |

\* cited by examiner

PNEUMATIC TIRE

TECHNICAL FIELD

The present invention relates to a pneumatic tire provided on the outer surface of a sidewall portion with a protector protruding axially outwardly.

BACKGROUND ART

There has been known a pneumatic tire whose sidewall portion is provided on the outer surface thereof with an axially outwardly protruding protector. Owing to the protector, the sidewall portion of such pneumatic tire can be prevented from cut damage caused by a sharp-edged stone and the like hitting the sidewall portion when running on rough dirt roads, for example.

Japanese Patent Application Publication No. 2012-006449 (Patent Literature 1) discloses a pneumatic tire with improved mud performance and cut resistance by improving the shape and position of a protector of the sidewall portion.

SUMMARY OF THE INVENTION

The pneumatic tire disclosed in the Patent Literature 1 can be improved in the cut resistant performance by increasing the protruding height of the protector of the sidewall portion. However, if the protruding height is large, the sidewall portion becomes easy to accumulate heat, and as a result, there is a possibility that the durability of the pneumatic tire is deteriorated.

The present invention was made in view of the above, and a primary object thereof is to provide a pneumatic tire of which durability is improved by providing a protector composed of patterned unit protrusions having an improved configuration.

According to the present invention, a pneumatic tire comprises sidewall portions at least one of which outer surface is provided with an axially outwardly protruding protector, the protector composed of patterned unit protrusions arranged at intervals in the tire circumferential direction, wherein each of the patterned unit protrusions comprises a first protruding portion, a second protruding portion and a third protruding portion, the first protruding portion and the second protruding portion extend in a tire radial direction and are spaced apart from each other in the tire circumferential direction, the third protruding portion connects between the first protruding portion and the second protruding portion, and the radial dimension of the first protruding portion is more than the radial dimension of the second protruding portion.

In the pneumatic tire according to the present invention, it is preferable that the third protruding portion is connected with the first protruding portion at a position radially away from the radially inner and outer ends of the first protruding portion.

In the pneumatic tire according to the present invention, it is preferable that the third protruding portion is connected with the second protruding portion at a position radially away from the radially outer and inner ends of the second protruding portion.

In the pneumatic tire according to the present invention, it is preferable that the third protruding portion is connected with each of the first protruding portion and the second protruding portion at a position closer to the radially inner end than the radially outer end thereof.

In the pneumatic tire according to the present invention, it is preferable that the third protruding portion is inclined with respect to the tire circumferential direction.

In the pneumatic tire according to the present invention, it is preferable that the circumferential dimension of the first protruding portion is the same as the circumferential dimension of the second protruding portion.

In the pneumatic tire according to the present invention, it is preferable that the radial height (radial position) of the radially outer end of the first protruding portion is substantially the same as the radial height (radial position) of the radially outer end of the second protruding portion.

In the pneumatic tire according to the present invention, it is preferable that the protector is formed within a radial range between 0.5 times and 0.9 times the cross sectional height of the tire from a bead base line.

According to the present invention, therefore, the protector is provided with not-protruding parts which are formed between the patterned unit protrusions arranged circumferentially at intervals. As a result, the sidewall portion becomes less likely to accumulate heat, while maintaining the cut resistance.

Further, the concavity/convexity structure of the patterned unit protrusions and the not-protruding parts can disturb the air flow along the sidewall portion during running, and generate turbulence around the protector. Therefore, it is possible to increase the heat dissipation. As a result, the temperature rise of the sidewall portion is suppressed and the durability of the pneumatic tire is improved.

Further, the patterned unit protrusion can be increased in the circumferential rigidity by the third protruding portion connecting between the first protruding portion and the second protruding portion. Thereby, the movement of a tire shoulder portion including a tread edge portion can be suppressed and the uneven-wear resistance can be improved to improve the durability of the pneumatic tire.

Furthermore, owing to the difference between the radial dimensions of the first and second protruding portions, a swirling air flow can be generated during running, therefore, the sidewall portion dissipates heat more efficiently, and the durability of the pneumatic tire can be further improved.

In this application including specification and claims, various dimensions, positions and the like of the tire refer to those under a normally inflated unloaded condition of the tire unless otherwise noted.

The normally inflated unloaded condition is such that the tire is mounted on a standard wheel rim and inflate to a standard pressure but loaded with no tire load.

The undermentioned normally inflated loaded condition is such that the tire is mounted on the standard wheel rim and inflated to the standard pressure and loaded with the standard tire load.

The standard wheel rim R is a wheel rim officially approved or recommended for the tire by standards organizations, i.e. JATMA (Japan and Asia), T&RA (North America), ETRTO (Europe), TRAA (Australia), STRO (Scandinavia), ALAPA (Latin America), ITTAC (India) and the like which are effective in the area where the tire is manufactured, sold or used.

The standard pressure and the standard tire load are the maximum air pressure and the maximum tire load for the tire specified by the same organization in the Air-pressure/Maximum-load Table or similar list.

For example, the standard wheel rim is the "standard rim" specified in JATMA, the "Measuring Rim" in ETRTO, the "Design Rim" in TRA or the like. The standard pressure is the "maximum air pressure" in JATMA, the "Inflation Pressure" in ETRTO, the maximum pressure given in the "Tire Load Limits at various Cold Inflation Pressures" table in TRA or the like. The standard load is the "maximum load capacity" in JATMA, the "Load Capacity" in ETRTO, the maximum value given in the above-mentioned table in TRA or the like.

Incidentally, the tread edges are the axial outermost edges of the ground contacting patch which occurs under the normally inflated loaded condition when the camber angle of the tire is zero.

DESCRIPTION OF THE PREFERRED EMBODIMENTS

An embodiment of the present invention will now be described in detail in conjunction with accompanying drawings.

Figure 1:
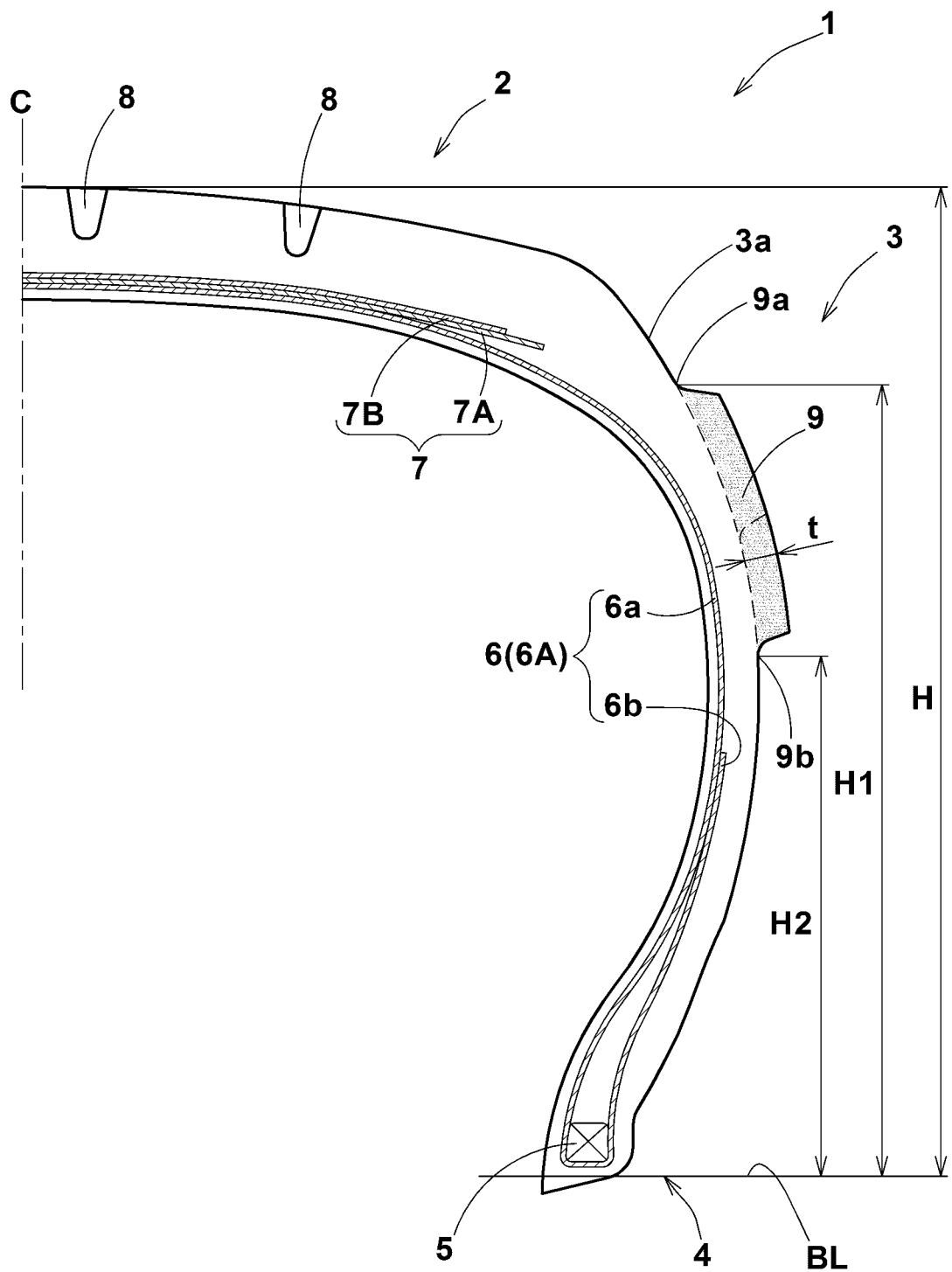
FIG. 1 is a cross sectional view of the pneumatic tire as an embodiment of the present invention.

FIG. 1 shows a cross-section of a pneumatic tire 1 as an embodiment of present invention under the normally inflated unloaded condition.

As shown, the pneumatic tire 1 comprises a tread portion 2, a pair of axially spaced bead portions 4 each with a bead core 5 therein, a pair of sidewall portions 3 extending between the tread edges and the bead portions 4, a carcass 6 extending between the bead portions 4 through the tread portion 2 and the sidewall portions 3, and a tread reinforcing belt 7 disposed radially outside the carcass 6 in the tread portion 2.

The tread portion 2 is suitably provided with grooves 8 for draining water or mud.

The carcass 6 is composed of at least one (in this embodiment, only one) ply 6A of cords extending between the bead portions 4 through the tread portion 2 and the sidewall portions 3, and turned up around the bead core 5 in each of the bead portions 4 from the axially inside to the outside f the tire so as to form a pair of turned up portions 6b and a main portion 6a therebetween. The carcass cords of the ply 6A are arranged at an angle in a range from 75 to 90 degrees with respect to the tire equator c, for example.

As for the carcass cords, organic fiber cords made of nylon, polyester, rayon, or the like can be suitably used.

The belt 7 comprises at least two plies (in this embodiment, only two cross plies 7A and 7B) each made of parallel cords laid at an angle in a range from 15 to 35 degrees with respect to the tire equator C, for example.

Incidentally, the belt cords of the belt ply 7A intersect with those of the belt ply 7B.

As for the belt cords, high modulus cords, in particular steel cords are preferably used.

According to the present invention, at least one of the sidewall portions 3 is provided with a protector 9 protruding axially outwardly from the outer surface 3a thereof. The protector 9 is made of rubber integrally with the sidewall portion. In this embodiment, each of the sidewall portions 3 is provided with the protector 9.

The protector 9 is preferably formed within a range between 0.5 times and 0.9 times the cross sectional height H of the tire from the bead base line BL. Such protector 9 can improve the cut resistant performance of the sidewall portion 3. Here, the cross sectional height H of the tire is a radial distance from the bead base line BL to the ground contacting surface of the tread portion at the tire equator C.

More preferably, the radial height H1 of the radially outer end 9a of the protector 9 from the bead base line BL is set in a range between 0.75 times and 0.85 times the cross sectional height H of the tire.

If the radial height H1 is more than 0.85 times the cross sectional height H, the radially outer end 9a of the protector 9 becomes likely to come into contact with the ground when running on even roads such as well paved roads. Therefore, there is a possibility that the ride comfort is deteriorated and the wear of the protector 9 occurs at an early stage.

On the other hand, if the height H1 is less than 0.75 times the cross sectional height H, the region of the tire where cut damage is likely to occur cannot be protected, and it becomes difficult to improve the cut resistant performance.

Further, it is preferred that the radial height H2 of the radially inner end 9b of the protector 9 from the bead base line BL is set in a range between 0.5 times and 0.6 times the cross sectional height H of the tire.

If the radial height H2 is more than 0.6 times the cross sectional height H, the range protected by the protector 9 becomes small, and the cut resistant performance can not be improved effectively.

On the other hand, if the height H2 is less than 0.5 times the cross sectional height H, the protector 9 becomes excessively large, therefore, it is possible that the tire weight increases and the heat becomes likely to accumulate.

The protruding height t of the protector 9 is preferably not less than 2 mm, more preferably not less than 4 mm. If the protruding height t is less than 2 mm, the effect of the protector 9 to protect the sidewall portion 3 is decreased, and the cut resistant performance is not improved.

The protruding height t of the protector 9 is preferably not more than 15 mm, more preferably not more than 12 mm. If the protruding height t is more than 15 mm, the tire weight increases and heat is likely to accumulate in the protector 9.

Figure 2:
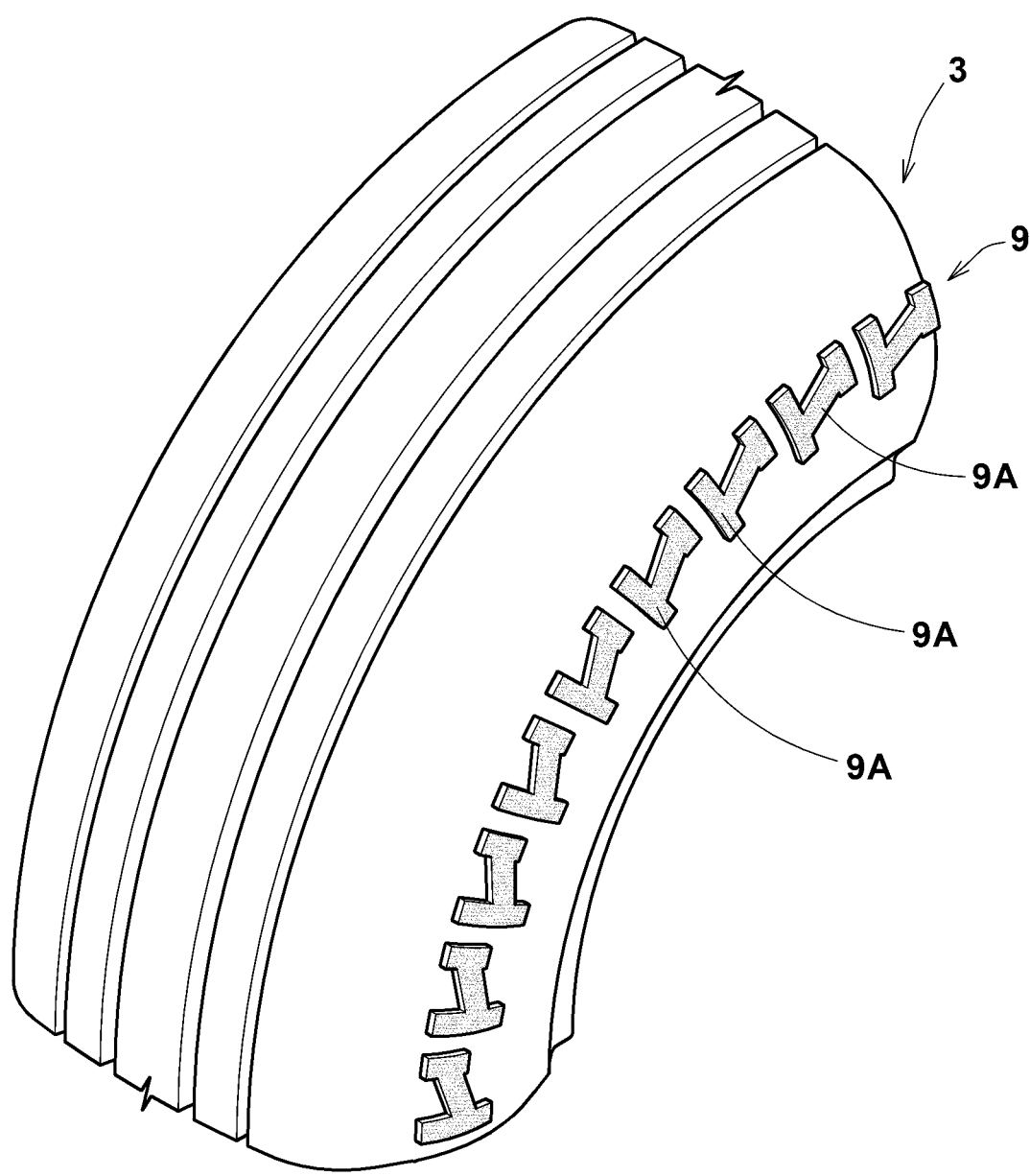
FIG. 2 is a perspective partial view of the tire showing the protector.

FIG. 2 is a perspective view of the protector 9. As shown, the protector 9 in this embodiment is composed of a number of patterned unit protrusions 9A arranged at intervals in the tire circumferential direction. In this embodiment, the patterned unit protrusions 9A on each of the sidewall portions 3 have the same shape and arranged in the same direction with respect respective radial directions of the tire. Preferably, the patterned unit protrusions 9A are disposed at substantially the same radial height.

As the patterned unit protrusions are arranged at intervals, the protector 9 is provided with not-protruding parts between the patterned unit protrusions. Therefore, the sidewall portion 3 becomes less likely to accumulate heat, while maintaining the cut resistant performance.

Further, the concavity/convexity structure of the patterned unit protrusions 9A and the not-protruding parts can disturb the air flow along the outer surface of the sidewall portion. As a result, it is possible to increase the heat dissipation. Accordingly, the temperature rise of the sidewall portion 3 is suppressed and the durability of the tire 1 is improved.

Figure 3:
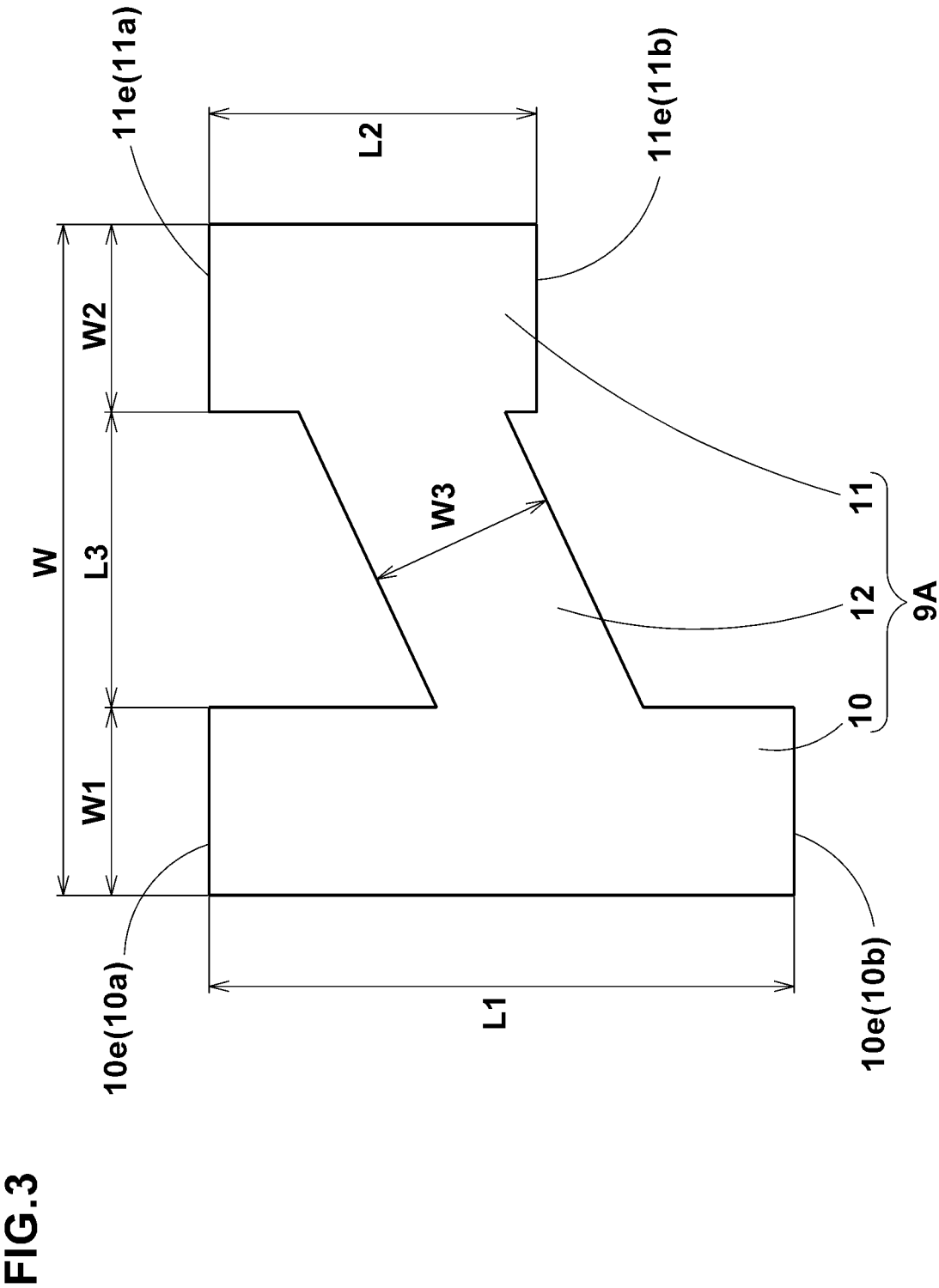
FIG. 3 shows a patterned unit protrusion.

In this embodiment, the patterned unit protrusion 9A is composed of a first protruding portion 10, a second protruding portion 11 and a third protruding portion 12 as shown in FIG. 3.

The first protruding portion 10 and the second protruding portion 11 extend in the tire radial direction, and are arranged so as to be spaced away from each other in the tire circumferential direction.

The first protruding portion 10 is configured as substantially rectangular having a radial dimension L1 and a circumferential dimension w1. The radial dimension L1 is preferably greater than the circumferential dimension w1.

It is preferred that the circumferential dimension w1 is set in a range from 0.15 times to 0.3 times the circumferential dimension w of the patterned unit protrusion 9A.

If the circumferential dimension w1 is less than 0.15 times the circumferential dimension w, there is possibly that the effect of the protector 9 to protect the sidewall portion 3 is decreased, and the cut resistant performance is not improved. On the other hand, if the circumferential dimension w1 is greater than 0.3 times the circumferential dimension w, there is a possibility that the tire weight is increased, and heat is accumulated in the patterned unit protrusion 9A.

The above-mentioned second protruding portion 11 is configured as substantially rectangular having a radial dimension L2 and a circumferential dimension w2.

The radial dimension L2 is preferably more than the circumferential dimension w2.

The circumferential dimension w2 is preferably set in a range from 0.15 times to 0.3 times the circumferential dimension w. If the circumferential dimension w2 is less than 0.15 times the circumferential dimension w, there is a possibility that the effect of the protector 9 to protect the sidewall portion 3 decreases, and the cut resistant performance is not improved. On the other hand, if the circumferential dimension w2 is greater than 0.3 times the circumferential dimension w, there is a possibility that the tire weight increases, and heat is accumulated.

In this embodiment, the radial dimension L1 of the first protruding portion 10 is more than the radial dimension L2 of the second protruding portion 11. The patterned unit protrusion 9A having such first and second protruding portions 10 and 11 can generate a swirling air flow therearound during running due to the difference between the radial dimensions L1 and L2. As a result, the sidewall portion 3 can dissipate heat more efficiently, and the durability of the tire 1 can be further improved.

The first protruding portion 10 has a pair of radial ends 10e, namely, a radially outer end 10a and a radially inner end 10b, between which the radial dimension L1 is defined.

The second protruding portion 11 has a pair of radial ends 11e, namely, a radially outer end 11a and a radially inner end 11b, between which the radial dimension L2 is defined.

It is preferred that the radial height of the radially outer end 10a of the first protruding portion 10 is substantially the same as the radial height of the radially outer end 11a of the second protruding portion 11.

In this case, the radially inner end 11b of the second protruding portion 11 is positioned radially outside the radially inner end 10b of the first protruding portion 10. Thereby, it is possible to have a wide range of non-convexed part radially inside the radially inner end 11b of the second protruding portion 11, therefore, it is possible to generate a greater swirling air flow during running.

It is preferred that the circumferential dimension w1 of the first protruding portion 10 is substantially the same as the circumferential dimension w2 of the second protruding portion 11. The patterned unit protrusion 9A having such first and the second protruding portions 10 and 11 can suppress deterioration of ride comfort, disproportion of the rigidity in the tire circumferential direction, and uneven wear of the tire 1.

It is preferred that a distance L3 between the first protruding portion 10 and the second protruding portion 11 in the tire circumferential direction is more than the circumferential dimension w1 of the first protruding portion 10 and more than the circumferential dimension w2 of the second protruding portion 11. By increasing the distance L3 as above, it is possible to further suppress the heat accumulation in the sidewall portion 3.

The above-mentioned third protruding portion 12 connects between the first protruding portion 10 and the second protruding portion 11 in the tire circumferential direction.

By the third protruding portion 12, the patterned unit protrusion 9A can be increased in the rigidity in the tire circumferential direction. As a result, the third protruding portions 12 suppress the movement of the tread edge, and improve the uneven wear resistance performance, therefore, it is possible to improve the durability of the tire 1.

It is preferred that the third protruding portion 12 is connected with the first protruding portion 10 at a position radially away from both of the radial ends 10e (the radially outer end 10a and the radially inner end 10b). Thereby, the first protruding portion 10 is likely to generate turbulence in the vicinity of the radial ends 10e during running, therefore, it is possible to increase the heat dissipation from the sidewall portion 3.

It is preferred that the third protruding portion 12 is connected with the second protruding portion 11 at a position radially away from both of the radial ends 11e (the radially outer end 11a and the radially inner end 11b). Thereby, the second protruding portion 11 is likely to generate turbulence in the vicinity of the radial ends 11e during running, therefore, it is possible to increase the heat dissipation from the sidewall portion 3.

Preferably, the third protruding portion 12 is connected to a part of the first protruding portion 10 closer to the radially inner end 10b, and connected to a part of the second protruding portion 11 closer to the radially inner end 11b. In other words, the radial center of the connection part of the third protruding portion 12 with the first protruding portion 10 is positioned closer to the radially inner end 10b than the radially outer end 10a, and the radial center of the connection part of the third protruding portion 12 with the second protruding portion 11 is positioned closer to the radially inner end 11b than the radially outer end 11a. Therefore, when the radially outer parts of the first and second protruding portions 10 and 11 contact with the mud and the like during running on muddy roads, for example, the radially outer parts can transmit more drive power, and the traction performance can be improved.

The third protruding portion 12 is preferably inclined with respect to the tire circumferential direction in order to increase the rigidity both in the tire circumferential direction and the tire radial direction.

It is preferred that the width w3 of the third protruding portion 12 measured orthogonally to the longitudinal direction thereof is substantially the same as the circumferential dimension w1 of the first protruding portion 10 and the circumferential dimension w2 of the second protruding portion 11. Thereby, the patterned unit protrusion 9A consisting of the protruding portions 10, 11 and 12 can suppress local unevenness of the rigidity, deterioration of ride comfort, and uneven wear of the tire 1.

It is preferred that the total area of the first, second and third protruding portions 10, 11 and 12 is set in a range from 40% to 60% of the area of a rectangle whose height and width correspond to the radial dimension L1 of the first protruding portion 10 and the circumferential dimension w of the patterned unit protrusion 9A.

If less than 40%, the effect to protect the sidewall portion 3 is decreased, and it is possible that the cut resistant performance is not improved. On the other hand, if more than 60%, the tire weight increases, and it is possible that the heat is likely to accumulate therein.

while detailed description has been made of an especially preferable embodiment of the present invention, the present invention can be embodied in various forms without being limited to the illustrated embodiment.

WORKING EXAMPLES

Test tires (pneumatic tires of size 265/70R17 for passenger cars) having the structure shown in FIG. 1 and specifications listed in Table 1 were experimentally manufactured and tested for the cut resistant performance, heat dissipation performance and uneven wear resistance performance. The test methods are as follows.

<Cut Resistant Performance>

The test tires were mounted on all of the wheels of a 4WD car, and after running for 1500 km on a rubble-strewn rough road, the sidewall portions were checked for cut damages. Then, for each of the cut damages, its length and width were multiplied to obtain the product, and the products were totalized.

The results are indicated in Table 1 by an index based on the reciprocal number of Comparative example 1 being 100, wherein the larger the index value, the higher the cut resistant performance.

<Heat Dissipation Performance>

Each test tire was set on a bench testing machine, and run for 24 hours at a speed of 100 km/h. Then, the temperature of the sidewall portion was measured.

The results are indicated in Table 1 by an index based on the reciprocal number of Comparative example 1 being 100, wherein the larger the numeric value, the lesser the heat accumulation (or the higher the heat dissipation performance).

<Uneven Wear Resistant Performance>

Each test tire was set on the bench testing machine, and run for 24 hours at a speed of 100 km/h. Then, the variation of wear of the tread portion was measured.

The results are indicated in Table 1 by an index based on the reciprocal number of comparative example 1 being 100, wherein the larger the numeric value, the higher the uneven wear resistance performance.

performance and the uneven wear resistant performance, while maintaining about the same cut resistant performance as the comparative examples.

REFERENCE SIGNS LIST

1 pneumatic tire
3 sidewall portion
3a outer surface of sidewall portion
9 protector
9A patterned unit protrusion
10 first protruding portion
11 second protruding portion
12 third protruding portion

The invention claimed is:

1. A pneumatic tire, comprising:
   sidewall portions;
   an axially outwardly protruding protector provided in an outer surface of at least one of the sidewall portions, the protector composed of patterned unit protrusions which are independent from each other and arranged at intervals in the tire circumferential direction,
   wherein a radially outer end of the protector is positioned at a height in a range between 0.75 times and 0.85 times a cross sectional height of the tire, each height measured in a tire radial direction from a bead base line,
   wherein each of the patterned unit protrusions comprises a first protruding portion, a second protruding portion and a third protruding portion,
   wherein each of the first protruding portion and the second protruding portion extends in the tire radial direction and have a radially inner end and a radially outer end and are spaced apart from each other in the tire circumferential direction,
   wherein the third protruding portion connects between the first protruding portion and the second protruding portion, and
   wherein a radial dimension of the first protruding portion is greater than a radial dimension of the second protruding portion.

2. The pneumatic tire according to claim 1, wherein the third protruding portion is connected with the first protruding portion at a position radially away from the radially inner and outer ends of the first protruding portion.

TABLE 1

| Tire | Comp. example 1 | Comp. example 2 | Comp. example 3 | Working example 1 | Working example 2 | Working example 3 | Working example 4 | Working example 5 | Working example 6 | Working example 7 |
|---|---|---|---|---|---|---|---|---|---|---|
| Third protruding portion | absence | absence | presence | presence | presence | presence | presence | presence | presence | presence |
| Ratio L2/L1 of first and second protruding portions | 1 | 0.5 | 1 | 0.5 | 0.3 | 0.7 | 0.5 | 0.5 | 0.5 | 0.5 |
| Ratio W2/W1 of first and second protruding portions | 1 | 1 | 1 | 1 | 1 | 1 | 0.7 | 1.5 | 1 | 1 |
| Connection position of third protruding portion with first and second protruding portions | NA | NA | Other than end | other than end | other than end | other than end | other than end | other than end | end | other than end |
| Inclination of third protruding portion with respect to tire circumferential direction | NA | NA | parallel | inclined | inclined | inclined | inclined | inclined | inclined | parallel |
| Cut resistant performance | 100 | 95 | 110 | 105 | 100 | 110 | 100 | 110 | 105 | 105 |
| Heat dissipation Performance | 100 | 110 | 90 | 120 | 125 | 110 | 120 | 110 | 110 | 110 |
| Uneven wear resistant Performance | 100 | 95 | 105 | 120 | 110 | 115 | 110 | 110 | 110 | 115 |

From the test results, it was confirmed that the test tires as the working examples were improved in the heat dissipation 3. The pneumatic tire according to claim 2, wherein the third protruding portion is connected with the second protruding portion at a position radially away from the radially outer end and radially inner end of the second protruding portion.

4. The pneumatic tire according to claim 2, wherein the third protruding portion is connected with each of the first protruding portion and the second protruding portion at a position closer to the radially inner end than the radially outer end of the first protruding portion and the second protruding portion.

5. The pneumatic tire according to claim 2, wherein the third protruding portion is inclined with respect to the tire circumferential direction.

6. The pneumatic tire according to claim 2, wherein a circumferential dimension of the first protruding portion is substantially the same as a circumferential dimension of the second protruding portion.

7. The pneumatic tire according to claim 2, wherein a radial height of the radially outer end of the first protruding portion is substantially the same as a radial height of the radially outer end of the second protruding portion.

8. The pneumatic tire according to claim 1, wherein the third protruding portion is connected with the second protruding portion at a position radially away from the radially outer end and radially inner end of the second protruding portion.

9. The pneumatic tire according to claim 8, wherein the third protruding portion is connected with each of the first protruding portion and the second protruding portion at a position closer to the radially inner end than the radially outer end of the first protruding portion and the second protruding portion.

10. The pneumatic tire according to claim 8, wherein the third protruding portion is inclined with respect to the tire circumferential direction.

11. The pneumatic tire according to claim 8, wherein a circumferential dimension of the first protruding portion is substantially the same as a circumferential dimension of the second protruding portion.

12. The pneumatic tire according to claim 8, wherein a radial height of the radially outer end of the first protruding portion is substantially the same as a radial height of the radially outer end of the second protruding portion.

13. The pneumatic tire according to claim 1, wherein the third protruding portion is connected with each of the first protruding portion and the second protruding portion at a position closer to the radially inner end than the radially outer end of the first protruding portion and the second protruding portion.

14. The pneumatic tire according to claim 1, wherein the third protruding portion is inclined with respect to the tire circumferential direction.

15. The pneumatic tire according to claim 1, wherein a circumferential dimension of the first protruding portion is substantially the same as a circumferential dimension of the second protruding portion.

16. The pneumatic tire according to claim 1, wherein a radial height of the radially outer end of the first protruding portion is substantially the same as a radial height of the radially outer end of the second protruding portion.

17. The pneumatic tire according to claim 16, wherein, with respect to each of the patterned unit protrusions, the total area of the first, second and third protruding portions is in a range from 40% to 60% of the area of a rectangle whose height and width correspond to the radial dimension of the first protruding portion and the circumferential dimension of the patterned unit protrusion.

18. The pneumatic tire according to claim 1, wherein a radially inner end of the protector is positioned at a height in a range between 0.5 times and 0.6 times the cross sectional height of the tire when measured in the tire radial direction from the bead base line.

19. The pneumatic tire according to claim 1, wherein each of the patterned unit protrusions consists of the first protruding portion, the second protruding portion and the third protruding portion.

20. The pneumatic tire according to claim 1, wherein in each of the patterned unit protrusions, a distance in the tire circumferential direction between the first protruding portion and the second protruding portion is more than a circumferential dimension of the first protruding portion and more than a circumferential dimension of the second protruding portion.

* * * * *